D. J. McADAM, Jr.
METHOD OF TESTING.
APPLICATION FILED MAY 18, 1916.
1,329,192.
Patented Jan. 27, 1920.
3 SHEETS—SHEET 3.
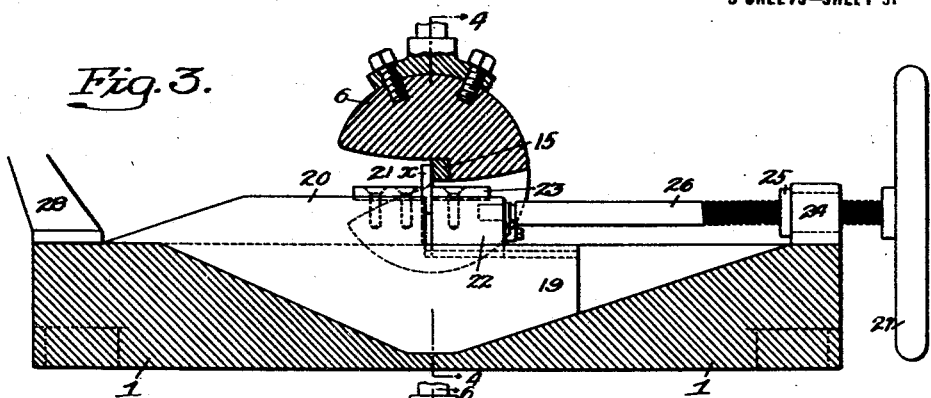
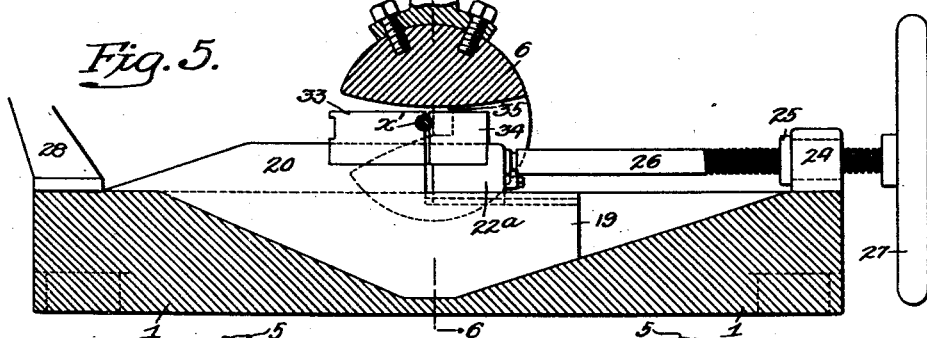
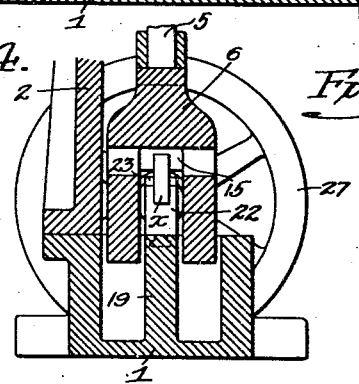 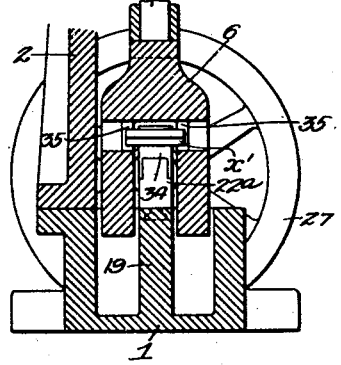
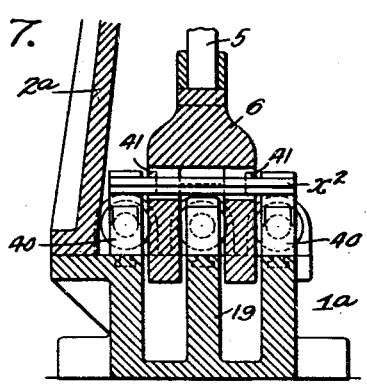
Inventor-
Dunlap J. McAdam, Jr.
by his Attorneys
Howson & Howson

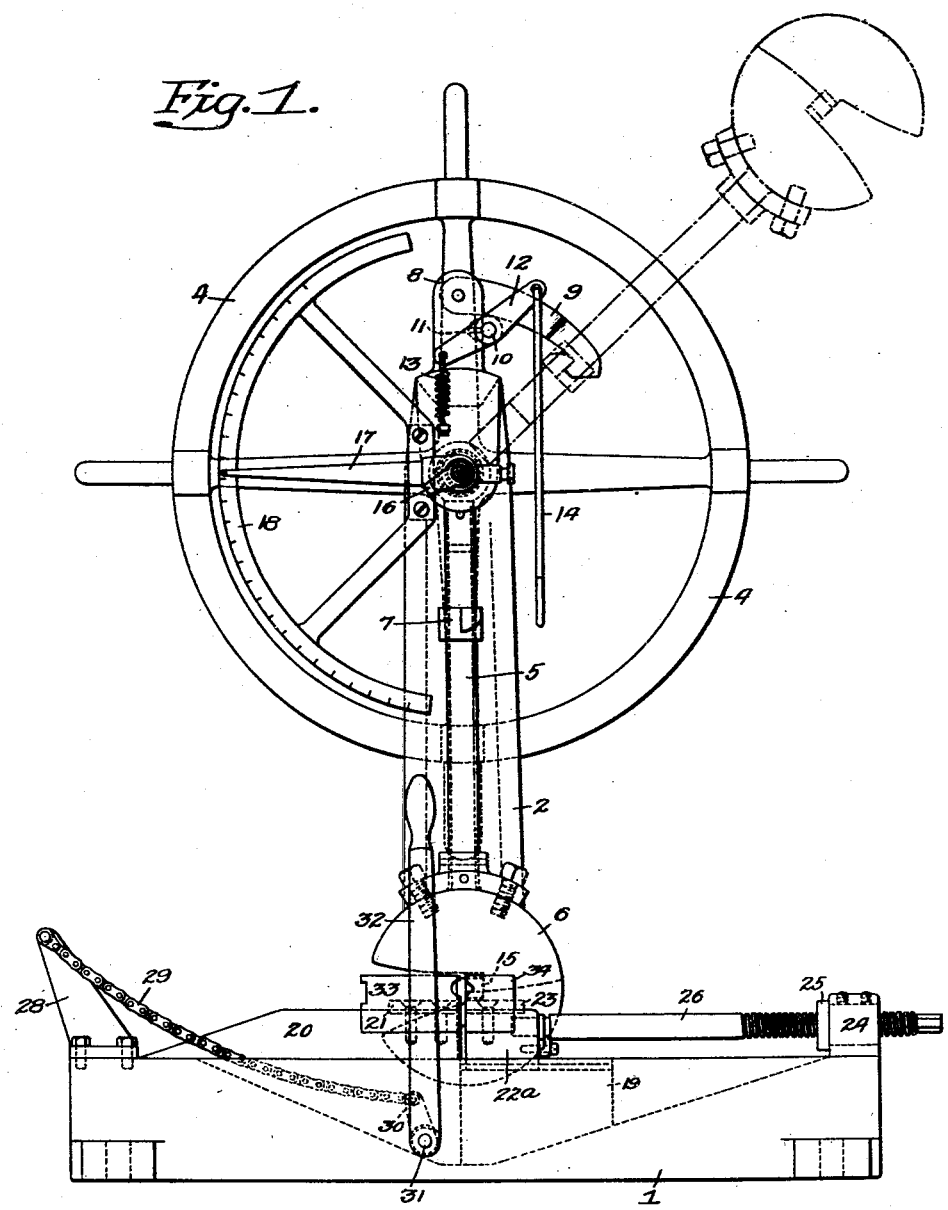

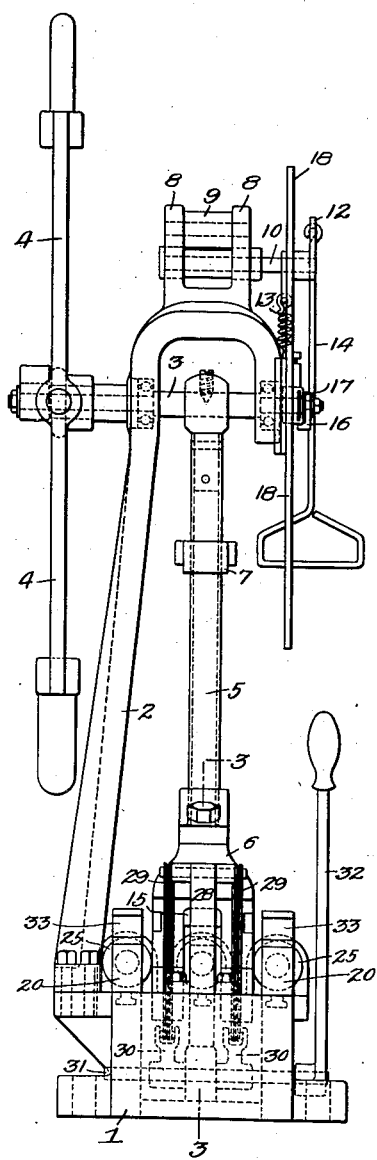

UNITED STATES PATENT OFFICE.

DUNLAP J. McADAM, JR., OF BALTIMORE, MARYLAND, ASSIGNOR TO TINIUS OLSEN TESTING MACHINE COMPANY, OF PHILADELPHIA, PENNSYLVANIA, A CORPORATION OF PENNSYLVANIA.

METHOD OF TESTING.

1,329,192.  Specification of Letters Patent.  Patented Jan. 27, 1920.

Application filed May 18, 1916. Serial No. 98,349.

*To all whom it may concern:*

Be it known that I, DUNLAP J. MCADAM, Jr., a citizen of the United States, residing in the city of Baltimore, State of Maryland, have invented Methods of Testing, of which the following is a specification.

One object of my invention is to provide a novel and convenient method of testing the resistance of various materials to a suddenly applied shearing stress or to a sudden blow so applied as to cause such material to fail by shearing; the test being of such a nature as to give reliable and consistent results.

These objects and other advantageous ends I secure as hereinafter set forth, reference being had to the accompanying drawings, in which;

Figures 1 and 2 are respectively a side and end elevation of a machine by which tests may be made according to my invention;

Fig. 3 is a section taken on the line 3—3, Fig. 2;

Fig. 4 is a vertical section of the simplest form of my machine;

Fig. 5 is a vertical section similar to Fig. 3 illustrating a slightly modified form of the machine;

Fig. 6 is a vertical section on the line 6—6, Fig. 5; and

Fig. 7 is a vertical section of a third modification of my machine.

In the above drawings 1 represents the base of a machine which may be used to carry out my method and this base preferably has the form of an elongated trough-like structure provided with an extension at the center of one side, on which is carried a vertically extending standard 2. The upper end of this is turned over in an inverted U-shaped form and provides bearings for a transverse shaft or spindle 3 to which a hand wheel 4 is fixed outside of the standard. Also fixed to this shaft between the two bearings provided by the upper end of the standard, is a bar 5 which, with a weight 6 attached to its lower end, constitutes a pendulum, having fixed to the upper part of said bar 5 a collar 7 projecting at opposite sides thereof.

The U-shaped top part of the standard 2 has projecting upwardly from it a pair of lugs 8 providing bearings for a pin on which is journaled a hook 9 designed to engage the projections of the collar 7 on the bar 5 to hold the pendulum in the elevated position shown in dotted lines in Fig. 1. These lugs also provide a support for a short spindle 10 carrying a cam 11 in position to raise the hook 9 out of engagement with the projections of the collar 7 and also having fixed to it a lever 12, one of whose ends is acted on by a spring 13 so that the cam is normally held in a position not affecting the lever 9. The opposite end of the lever has depending from it a bar 14 whose lower end has the shape of a handle by which the spindle 10 may be turned to cause its cam 11 to swing the hook 9 upwardly on its pivot into a position to release the pendulum.

The pendulum has the general form of a short cylinder 6 constituting a weight, attached to a bar 5 with its axis at right angles to the line thereof. As shown in Figs. 3 to 6, said weight is forked and has its central portion cut away from a point above the line of its axis, to its lowermost portion. Mounted in the weight 6 of the pendulum is a shearing edge 15 made in the form of a transversely extending piece of hardened steel or other metal of substantially rectangular or other suitable section and carried with its lower front edge coincident with a line passing through the center of percussion of said pendulum.

Fixed to the spindle 3 is an arm 16 designed to engage and move a pointer 17, rotatably carried by the overhung part of the bracket 2 concentrically with said spindle, and designed to coöperate with a circularly curved scale 18 graduated in suitable units, also supported from the bracket 2 concentrically with the spindle 3. As shown in Figs. 3 and 4, the trough 1 is provided with a central longitudinal partition 19, which from one end to a point adjacent the middle extends to practically the same height as the top of said trough but at the middle it rises vertically for a suitable distance to provide an abutment 20. On the top surface of this abutment immediately adjacent its vertical face is fixed a hardened steel piece 21 having a vertical face and a horizontal top, defining a right angle shearing edge.

Slidably mounted on the forward portion of the partition 19 is a clamping block 22 designed to coöperate with the abutment 20 and having a hardened steel piece 23 placed to coöperate with the piece 21 to grip a test specimen $x$. For adjusting the block to and retaining it in any given position, I extend the right hand end of the trough to form a lug 24 in which is mounted a nut 25 and through this nut operate a screw 26, one end of which is connected to the clamping block 22 while the other end is fixed to a hand wheel 27. The opposite end of the trough 1 carries a bracket 28 connected by a pair of chains 29 attached to two arms 30 fixed to a spindle 31 journaled in the sides of the trough. This spindle likewise has fixed to it a hand lever 32 whereby the arms 30 may be moved into such a position as to raise the chains 29 into the path of the pendulum 6 after this has engaged a test piece.

Under conditions of use, the pendulum is moved to the elevated position shown in Fig. 1, in which it is held by reason of the engagement of the hook 9 with the projections of the collar 7. A short elongated body of metal or other material to be tested is then gripped between the abutment 20 and the block 22 so that a short length of said piece projects above the level of the hardened jaws 21 and 23. If now the rod 14 be pulled downwardly the cam 11 raises the hook 9 and releases the pendulum, which thereupon swings down until its hardened edge 15 engages the upwardly projecting end of the test piece $x$ and shears it from the body thereof; it being noted that the pendulum is of such a length that the distance of the edge 15 from the edges 21 and 23 causes the test piece to fail by a sudden shearing action and not by breakage due to bending.

After this cutting of the test piece, the pendulum continues its movement and likewise moves the pointer 17 until under the action of gravity, it is stopped and caused to swing back. Obviously the distance through which said pendulum moves after its engagement with the test specimen is inversely proportional to or in a measure of the resistance of said specimen to impact shearing and consequently the position in which the pointer 17 is left, as indicated on the scale, gives a reading in suitable units, of this function of the piece of material tested. Obviously if there is no test piece engaged by the pendulum, the pointer will be moved to its zero position at the upper end of the scale, which is graduated in suitable units downwardly from its upper or zero end, so that direct readings may be obtained of the results of each test. The swinging of the pendulum may be stopped by a movement of the lever 32 to the right, since such action raises the chains 29 into position to engage and frictionally hold the weight 6.

If it be desired to subject the opposite overhung ends of a test piece simultaneously to impact shear, I construct the holding means and pendulum as shown in Figs. 5 and 6, providing a clamping block 33 mounted on the rear part of the partition 19, and a second clamping block 34 mounted on the member $22^a$ which slides on said partition. The upper portions of the abutting faces of these two blocks are notched or nicked so as to properly hold a test specimen $x'$ horizontally, with its ends projecting beyond the planes of the sides of the partition 19 in such position that they will be simultaneously engaged by hardened steel pieces 35 set in the adjacent edges of the forked part of the weight or head 6.

After the pendulum has been raised to its elevated position by a proper manipulation of the hand wheel 4 and has been engaged by the hook 9, the test specimen is put in place as shown in Fig. 6. Thereafter by releasing the weight as before described, the edges 35 coöperate with the forward edges of the block 33 to shear off the ends of the test specimen as the pendulum passes it, it being noted that in this case as well as in that illustrated in Figs. 3 and 4, said test specimen is engaged by a pair of edges or a part carried by the weight 6, in a line substantially coincident with a line passing through the center of percussion of the pendulum. As before, the distance moved through by said pendulum after it strikes the test piece and until it reverses its movement, is indicated by the pointer 17 and is a measure of the resistance of the specimen to impact shear.

In testing the impact shear of a piece held rigidly at both ends I may employ a machine constructed as shown in Fig. 7 wherein clamping members 40, made as shown in Fig. 5, are slidably guided on the side members of the trough shaped base $1^a$; there being a third clamp on the partition member 19 as in the above noted form of the machine. In this case the standard $2^a$ for supporting the pendulum, etc., is offset farther on one side, and the hardened shearing edges 41 are mounted on said pendulum as shown in Fig. 7.

With such an arrangement of parts a test piece $x^2$ is rigidly gripped at its ends by the two clamping members 40 and when the pendulum swings down as previously described, said piece is simultaneously engaged by the edges 41 at the two points immediately adjacent its rigidly held ends,—being thus subjected to a suddent impact shear which cuts it at the two points noted. As before the stress to which the piece is subjected is measured or indicated by the distance which the pointer is moved after the breakage of the test piece.

I claim:—

1. The method of testing which consists in rigidly mounting an elongated test piece with its ends overhanging their support; thereafter simultaneously subjecting both of said ends to a suddenly applied shearing stress immediately adjacent such support; and noting the amount of said stress.

2. The method of testing which consists in rigidly mounting a test piece with at least one of its ends overhung; thereafter cutting off said end by a sudden shearing stress applied immediately adjacent its junction with the body of the piece; and noting the amount of said stress.

3. The method of testing which consists in causing a body moving under the action of gravity to coact with a relatively fixed structure to suddenly shear a test piece; and measuring the force required for said shearing.

4. The method of testing which consists in causing a body swinging under the action of gravity to coact with a relatively fixed structure to engage and suddenly shear a test piece while it is moving with its maximum velocity; and measuring the distance moved through by said body after the shearing has occurred.

DUNLAP J. McADAM, Jr.